United States Patent [19]

Russell

[11] 4,454,635

[45] Jun. 19, 1984

[54] HOLDER FOR RELEASABLY SECURING A FERRITE CORE OR THE LIKE TO AN ELECTRICAL POWER LINE

[75] Inventor: Taft B. Russell, Edison, N.J.

[73] Assignee: Edison Control Corporation, Metuchen, N.J.

[21] Appl. No.: 435,251

[22] Filed: Oct. 19, 1982

[51] Int. Cl.³ .................... H01R 25/00; A44B 13/00
[52] U.S. Cl. .................................. 24/462; 24/241 R; 24/241 SL; 24/455; 339/47 R
[58] Field of Search .......... 24/243 R, 255 SL, 20 R, 24/20 TT, 241 R, 241 SL, 263 R; 339/47 R

[56] References Cited

U.S. PATENT DOCUMENTS

| | | | |
|---|---|---|---|
| 2,796,648 | 6/1957 | Peterson | 339/47 R |
| 3,348,276 | 10/1967 | Miknaitis | 24/263 R |
| 3,757,031 | 9/1973 | Izraeli | 24/263 R |
| 3,760,811 | 9/1973 | Andrew | 24/263 R |
| 4,244,083 | 1/1981 | Aremka et al. | 24/263 R |
| 4,340,996 | 7/1982 | Starace | 24/255 SL |

Primary Examiner—Victor N. Sakran
Attorney, Agent, or Firm—Lewis H. Eslinger

[57] ABSTRACT

A holder for releasably securing a bifurcated core or the like to an electrical power line, the core having two substantially U-shaped portions which are abuttable to form a closed loop that encompasses the power line. An L-shaped boat has at least one leg with an interior configuration that is complementary to one U-shaped portion of the core to receive and hold that one portion. A gantry also having an interior configuration that is complementary to one leg of each U-shaped portion of the core receives both portions and is sufficiently long to permit one leg of each portion to be received while those portions are spaced from each other. The gantry has a guide groove on the exterior thereof for guiding a substantially L-shaped bale which is formed of resilient material and which has one leg that extends over the base of the other portion of the core and another leg which is received by and guided in the groove on the gantry. This other leg of the bale has an end that terminates in a handle which is adapted to be gripped and driven so as to move the portion of the core which is guided in the gantry to abut against the portion which is received in the boat, thereby encompassing the power line. The handle of the bale has a locking ear and the gantry has a locking slot which cooperates with the ear to releasably receive the locking ear, whereby the bale clamps the U-shaped portions of the core together.

11 Claims, 8 Drawing Figures

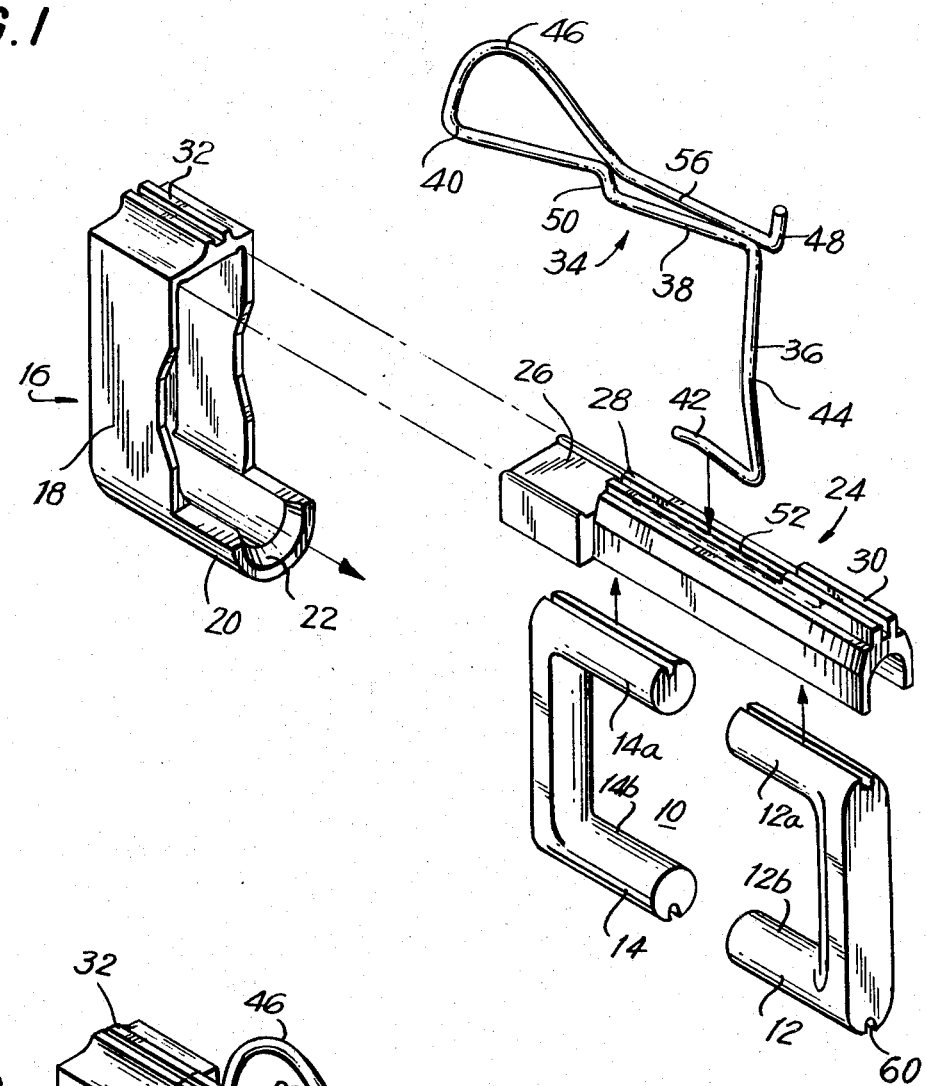
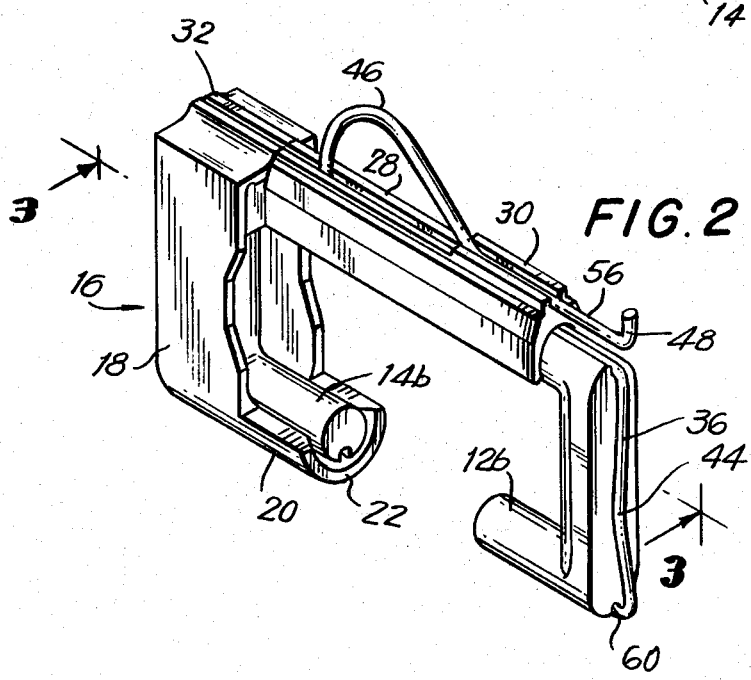

HOLDER FOR RELEASABLY SECURING A FERRITE CORE OR THE LIKE TO AN ELECTRICAL POWER LINE

BACKGROUND OF THE INVENTION

This invention relates to a holder for a bifurcated ferrite core or the like to permit that core to surround an electrical power line and, more particularly, to such a holder that is remotely operable to facilitate securing the core to and releasing that core from the power line. Preferably, the core is adapted to generate a flux in response to current flowing through the power line, this flux being detected by a fault indicator so as to provide a fault indication in the event that an excessive amount of current flows through the power line.

Electrical power fault indicators typically are used with high voltage or high power electrical lines to indicate an excessive current flowing through those lines. Such fault indicators normally are used in conjunction with a core, such as a ferrite core, that surrounds the electrical power line to generate a flux whose intensity is determined by the magnitude of the current flowing through that line. This flux, in turn, induces a sensing current which flows through the fault indicator. When this sensing current exceeds a predetermined threshold, as when the flux in the ferrite core becomes too large due to excessive current flowing through the power line, the fault indicator is 'tripped' to indicate a fault condition. In this manner, the location of a fault may be ascertained by power utility technicians, and the fault condition may be rectified.

Some fault indicators are mechanically coupled to the very same support that is used to support or house the ferrite core. Other fault indicators are coupled to the ferrite core by electrical conductors, thereby enabling the indicator, or meter, to be mounted at a location that is remote from the core. In either embodiment, it is necessary to provide some means by which the ferrite core may be releasably secured to the power line. In one known device, the ferrite core is formed of two separate, abuttable U-shaped portions. One portion is coupled to an insulated holder, such as a plastic holder, which first is brought into engagement with the power line. Then, the other U-shaped portion is brought into abutting relationship with the first, and the two portions are clamped together so as to form a continuous closed loop which surrounds the power line.

One disadvantage of the core holder of the aformentioned type is that it is difficult to align the two U-shaped portions of the core and then to bring those aligned portions together into clamping relationship. Usually, a number of tools must be used to effect this aligned clamping relationship, and often the holder is not properly restrained on the power line. Also, current normally flows through the power line which presents a hazard to the technician who is attempting to secure the core thereto. Another disadvantage is that the core holder of the aforementioned type is not easily manipulated with a "hot stick" that conventionally is used with high voltage power lines.

OBJECTS OF THE INVENTION

Therefore, it is an object of the present invention to provide an improved holder for a core that is releasably secured to an electrical power line which avoids the aforenoted disadvantages.

Another object of this invention is to provide an improved core holder which may be used with high voltage fault indicators.

A further object of this invention is to provide an improved core holder which can be easily and safely manipulated by a technician using a "hot stick" so as to releasably secure a core to a high power line.

Various other objects, advantages and features of the present invention will become readily apparent from the ensuing detailed description, and the novel features will be particularly pointed out in the appended claims.

SUMMARY OF THE INVENTION

In accordance with this invention, a core holder is provided for releasably securing a bifurcated ferrite core or the like to an electrical power line, the bifurcated core being of the type having two substantially U-shaped portions which are abuttable to form a closed loop that encompasses the power line. The holder includes a substantially L-shaped boat having an interior configuration that is complementary to one U-shaped portion of the core to receive and hold that one portion. A gantry parallel to one leg of the boat is coupled to the other leg thereof and receives both U-shaped portions of the core. The gantry has an interior configuration that is complementary to one leg of each U-shaped portion and is long enough to permit both portions to be received thereby while spaced from each other. A guide groove is provided on the exterior of the gantry for receiving a portion of one leg of a L-shaped bale. This bale is formed of resilient material and the other leg thereof extends over the base of the U-shaped portion of the core (i.e. that portion which is not received by the boat). The leg of the bale which is received by the groove on the gantry has an end which terminates in a handle adapted to be gripped and driven so as to move the other U-shaped portion to abut against the portion received in the boat and, thus, encompass the power line. The handle of the bale has a locking ear and the gantry has a locking slot which cooperates with that ear to releasably receive said ear, whereby the bale clamps the U-shaped portions together.

BRIEF DESCRIPTION OF THE DRAWINGS

The following detailed description, given by way of example, will best be understood in conjunction with the accompanying drawings in which:

FIG. 1 is an exploded perspective view of a preferred embodiment of the present invention;

FIG. 2 is a perspective view of the core holder in its released condition;

DETAILED DESCRIPTION OF A PREFERRED EMBODIMENT

Figure 3:
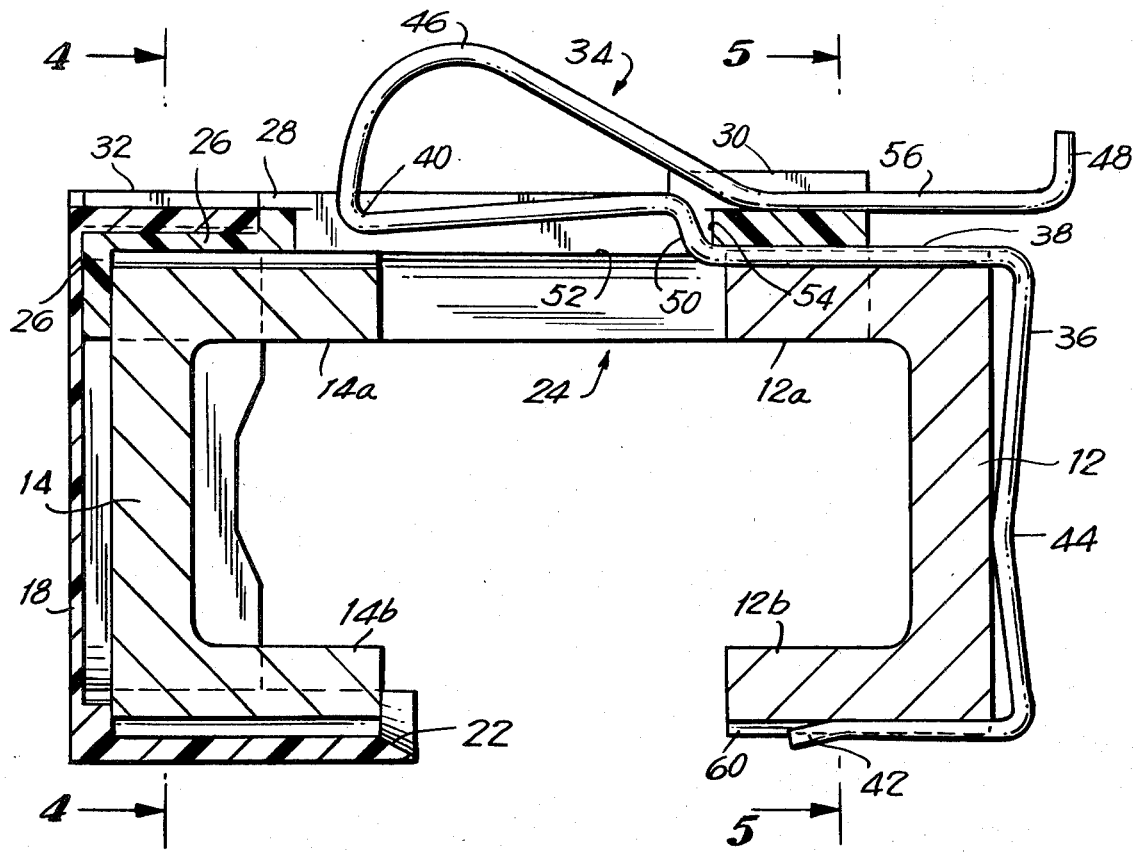
FIG. 3 is a sectional view of FIG. 2 taken along the lines 3—3.

Referring now to the drawings, wherein like reference numerals are used throughout, FIGS. 1 and 2 are perspective views of the core holder in combination with a ferrite core 10, shown particularly in FIG. 2 as exhibiting the released condition. The core holder is comprised of a boat 16 which is of a substantially L-shaped configuration having a base member 18 and a leg 20 extending therefrom. Boat 16 is adapted to receive one-half of ferrite core 10. In particular, the boat is adapted to receive U-shaped portion 14 which, as illustrated, is comprised of a base which is received by base 18 of boat 16, and two legs 14a and 14b extending upwardly from the base. Preferably, the cross-section of the legs is substantially circular, and leg 20 of boat 16 is provided with an interior configuration that is complementary to this circular cross-section. As shown in FIG. 1, leg 20 is formed substantially U-shaped. The free end of this leg terminates in a flare section 22 for a purpose to be described.

Figure 4:
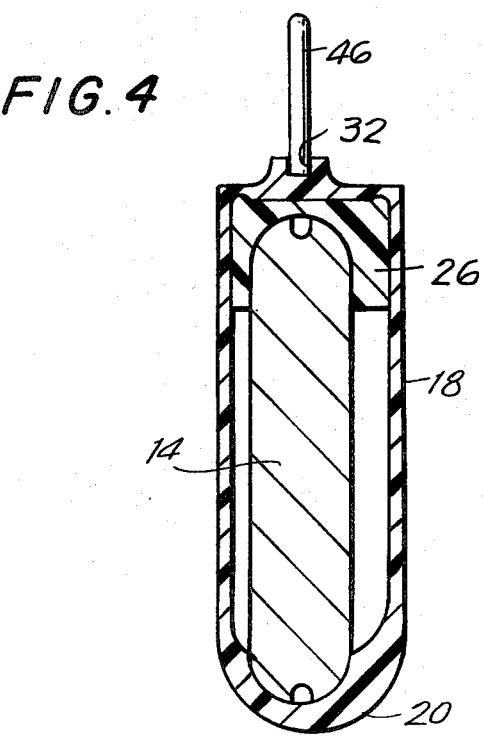
FIG. 4 is a sectional view of the core holder taken along the lines 4—4 in FIG. 3.
Figure 8:
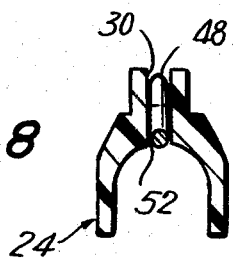
FIG. 8 is a sectional view taken along the lines 8—8 in FIG. 7.

The core holder also includes a gantry 24 that is provided with one end 26 which, when assembled to boat 16, is received by the boat such that the gantry extends opposite and parallel to leg 20. The main portion of gantry 24, that is, that portion extending from end 26, exhibits an interior cross-section which is complementary to the circular cross-section of the legs of ferrite core 10. As shown in FIG. 1, and as particularly shown in FIGS. 4, 5 and 8, the interior cross-section of gantry 24 is substantially U-shaped.

The other half of ferrite core 10, that is, U-shaped portion 12, is comprised of two legs 12a and 12b extending from a base. Legs 12a and 14a are adapted to be received by gantry 24 and, preferably, U-shaped portion 14 is adhesively fixed within boat 16, as by a suitable cement or potting compound. U-shaped portion 12, however, is permitted to slide within gantry 24 from its released position, illustrated in FIG. 2 wherein the U-shaped portions are spaced from each other, to the operative position illustrated in FIG. 7, whereupon the respective U-shaped portions abut against each other. It is a feature of this invention to permit U-shaped portion 12 to slide within gantry 24 from the released to the operative positions thereof, whereby the core holder and core 10 are fitted about and secured to an electrical power line. When the two U-shaped portions abut each other, they form a closed loop which, as is recognized, is used to sense the current flowing through the power line.

Gantry 24 is provided with a guide groove 28 on one exterior wall thereof, this guide groove extending to a projected portion 30 at the end of the gantry opposite end 26. When gantry 24 is assembled with boat 16, guide groove 28 is coextensively disposed with a similar guide groove 32 which is provided on the wall of base 18 which is opposite leg 20, as clearly shown in FIGS. 1 and 2.

As mentioned above, U-shaped portion 14 is adhesively secured within boat 16. This is illustrated in FIGS. 2 and 3. U-shaped portion 12 is slidably fitted within gantry 24. Although not illustrated in the drawings, a conventional O-ring may be provided to assist in the support of U-shaped portion 12 within gantry 24. It also is preferred that end 26 of the gantry be adhesively secured within boat 16 so as to form an integral core holder structure as illustrated in FIGS. 2, 3, 6 and 7. U-shaped portion 12 is slidable within this core holder.

Figure 5:
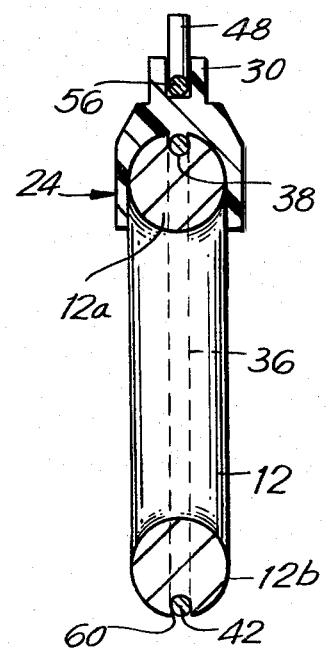
FIG. 5 is a sectional view of the core holder taken along lines 5—5 in FIG. 3.
Figure 6:
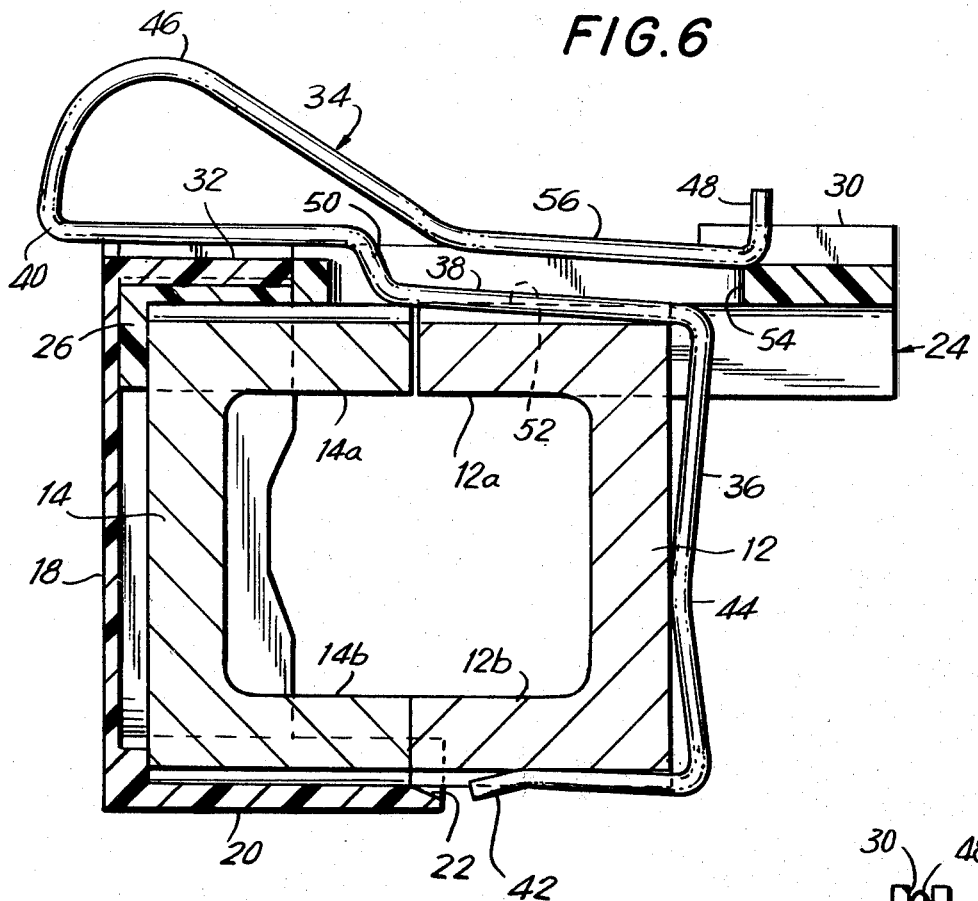
FIG. 6 is a side sectional view of the core holder immediately prior to its clamping condition.

A bale 34 preferably is formed of resilient material and is substantially L-shaped, with one leg 36 thereof being fitted over and about the base of U-shaped portion 12, as illustrated in FIG. 2, and leg 38 of the bale being slidable within guide groove 28, including the projected section 30 thereof. Leg 36 terminates in a bent portion 42 which, as best illustrated in FIGS. 3, 5 and 6, engages within a groove 60 which is provided on the exterior of leg 12b of U-shaped portion 12. The combination of leg 36 and bent portion 42, together with groove 60, permits bale 34 to grip and secure U-shaped portion 12 of the ferrite core.

Leg 38 is seen to terminate in an end 40 which is bent about to form a handle 46, this handle having a portion 56 which extends opposite leg 38 to terminate in a locking ear 48. An intermediate portion of leg 38, that is, that portion thereof between leg 36 and handle 40, is provided with a step 50. This step is advantageous in the assembly of bale 34 to gantry 24.

As indicated by the broken lines in FIG. 1, and as best illustrated in FIG. 3, a locking slot 52 is provided at the bottom of guide groove 28 so as to form a slot or slit through this portion of gantry 24. When bale 34 is assembled with U-shaped portion 12 and is fitted within guide groove 28, leg 38 extends through locking slot 52, whereas the upper portion of handle 56, that is, that section of portion 56 which is adjacent locking ear 48, slides in projected section 30 of guide groove 28. Thus, and as best shown in FIG. 5, leg 38 and portion 56 effectivley sandwich the base portion of projected section 30 of guide groove 28 when bale 34 and U-shaped portion 12 are disposed in the released position (FIGS. 2 and 3).

If a force is exerted on, for example, handle 46 so as to drive bale 34 from its released position to its operative position, this force on the bale tends to drive U-shaped portion 12 toward U-shaped portion 14. The bale continues to slide in guide groove 28 and locking slot 52 until locking ear 48 extends to the locking slot and, particularly, extends to shoulder 54 (FIG. 6). Further force exerted on handle 46 results in locking gear 48 being inserted into the locking slot and abutting against shoulder 54. At this time, the two U-shaped portions abut each other and, moreover, bale 34 is locked by reason of the abutment of locking ear 48 against shoulder 54, as clearly shown in FIG. 7. It is appreciated that the spring bias force exerted in the direction of arrow A in FIG. 7 tends to drive the locking ear into the locking slot to abut against shoulder 54.

Figure 7:
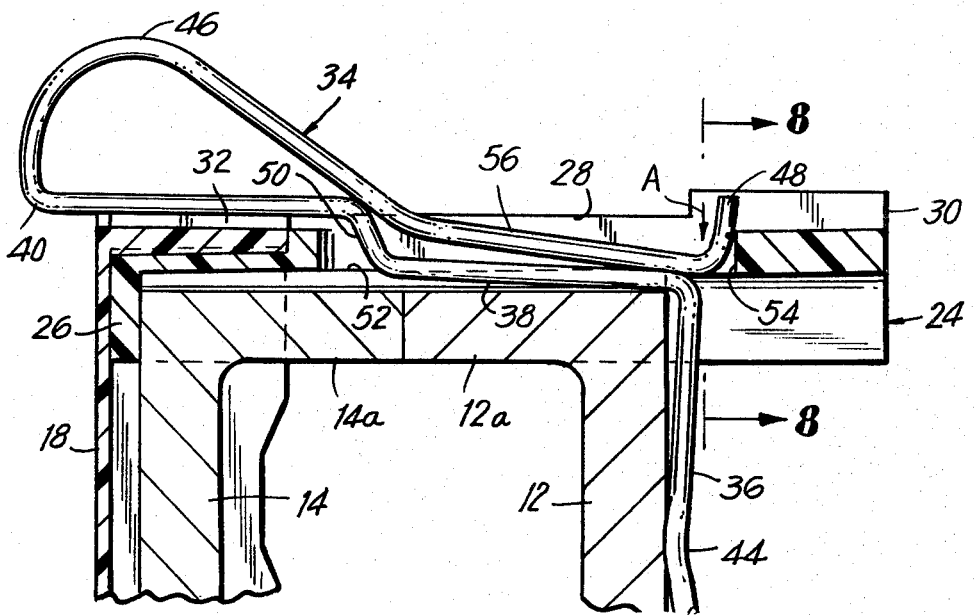
FIG. 7 is a side sectional view of the core holder in its clamping position.

To release the locking effect of the bale and, thus, to permit U-shaped portion 12 to slide to its released position, a rotational force should be exerted on handle 46 so as to drive locking ear 48 in the direction opposite arrow A of FIG. 7. This may be achieved by using a conventional "hot stick" or other suitable applicator tool, such as the "Tel-o-pole" manufactured by Hastings Fiberglass Products, Inc. of Hastings, MI. When the hot-stick tool is inserted into handle 46 and manipulated by a workman, portion 56 is urged in the counter-clockwise direction, as viewed in FIG. 7, so as to release locking ear 48 from abutment against shoulder 54, thereby releasing the bale which then returns to the position illustrated in FIG. 6. The return to this position is due to the spring bias force exerted on the bale by reason of the resilient material from which it is manufactured. Then, if the hot-stick applicator is driven in the left-to-right directions, as viewed in FIG. 6, the bale, together with U-shaped portion 12 which is effectively clamped between leg 38 and bent portion 42 of the bale, is driven to its released position so as to be spaced apart from U-shaped portion 14. Portion 12 is seen to slide within gantry 24 so as to be urged from the position shown in FIG. 6 to the position shown in FIGS. 2 and 3. To further ensure that portion 12 is properly clamped to bale 34, another O-ring (not shown) may be disposed about leg 36 and the base of U-shaped portion 12.

It is seen that flare section 22 at the end of leg 20 of boat 16 is provided so as to properly receive and guide leg 12b U-shaped portion 12 when this portion is driven toward and into abutting relationship with U-shaped portion 14. Also, it will be recognized that step 50, which is provided in leg 38 approximately midway between leg 36 and 40 end, ensures that leg 38 is positioned in locking slot 52 interiorly of gantry 24, whereas that portion of the bale between step 50 and end 40 merely is guided by guide grooves 28 and 32 and is not positioned within the locking slot.

As illustrated in the drawings, leg 36 is provided with a bend 44 that is disposed approximately in the middle section of this leg. This bend contacts the base of U-shaped portion 12 and provides resilience when the hot-stick applicator pulls on bale 34 in a direction to bring the U-shaped portions into abutment and to lock the bale in the gantry. Moreover, the combination of bend 44 and step 50 exerts a clockwise rotational force (as viewed in the drawings) on U-shaped portion 12. By reason of this force, U-shaped portion 12 is angularly biased such that, when this portion is brought into abutment with U-shaped portion 14, the end faces of legs 12b and 14b abut before the end faces of legs 12a and 14a. Hence, and as shown in FIG. 6, the abutment of legs 12b and 14b is accompanied by a small gap between legs 12a and 14a. This assures proper alignment of the U-shaped portions to each other and, moreover, ensures that the respective legs thereof will be brought into proper abutting relationship. It is seen that, when legs 12b and 14b abut, locking ear 48 of bale 34 has not yet reached locking slot 52. Nevertheless, when an additional force is exerted on the bale, as by the use of the aforementioned hot-stick applicator, this force tends to overcome the spring bias force exerted by bend 44 on the base of U-shaped portion 12, thus bringing the end faces of legs 12a and 14a into abutment, and further bringing locking ear 48 into locking slot 52 such that this ear now abuts against shoulder 54, as shown in FIG. 7.

Although not shown in the drawings, it will be recognized that, if desired, a handle may be pivotally mounted on base 18 of boat 16. For example, this handle may be U-shaped whose legs are respectively pivotally coupled to base 18. Alternatively, this handle may be pivotally coupled to gantry 24. In either embodiment, it is preferred that this handle be spring-biased such that, when the core holder is used to secure core 10 to an electrical power line, this spring-biased handle first is contacted and rotated by the power line and, when the core holder is driven to its operative position, the biased handle is released so as to clamp the core holder to the power line.

While the present invention has been particularly shown and described with reference to a preferred embodiment, it will be readily appreciated by those of ordinary skill in the art that various changes and modifications in form and details may be made without departing from the spirit and scope of the invention. For example, for ease and efficiency in manufacturing, it is preferred that U-shaped portions 12 and 14 are substantially identical and, thus, symmetrical. However, asymmetrical core portions may be used, if desired. Moreover, it is seen that only one groove 60 need be provided in, for example, leg 12b of U-shaped portion 12 in order to receive bent portion 42 of bale 34. The remaining grooves which are illustrated but not identified in the core portions may be omitted. However, in order to facilitate assembly of the respective core portions in the field, it is preferred that such portions be substantially identical and, thus, symmetrical. It is for this reason that the remaining grooves are illustrated in legs 12a, 14a and 14b. Such grooves may, however, be omitted. Also, no specific dimensions of core 10, boat 16 or gantry 24 have been mentioned herein. These dimensions are not critical. Advantageously, however, gantry 24 is sufficiently long so as to permit U-shaped portion 12 to slide therein between its released position (FIGS. 1, 2 and 3) and its operative position (FIGS. 6 and 7) while still being effectively retained by the U-shaped interior of the gantry. Still further, in the embodiment illustrated herein, locking ear 48 is seen to be substantially parallel to but is disposed above leg 36 of bale 34. If desired, this locking ear may be aligned with leg 36 or may be disposed beneath this leg. It is important merely that locking ear 48 be driven into locking slot 52 so as to abut against shoulder 54 when legs 12a and 12b of U-shaped portion 12 abut against legs 14a and 14b, as illustrated in FIG. 7. That is, locking ear 48 should be driven into locking slot 52 when handle 46 of bale 34 is driven by, for example, the hot-stick applicator, to its locked position.

Still further, although the preferred application of the present invention is to releasably secure bifurcated ferrite core 10 to an electrical power line, a more general application is to position two halves of a fragile bifurcated loop around a relatively rigid member.

It is intended that the appended claims be interpreted as including the foregoing as well as various other changes and modifications.

What is claimed is:

1. A holder for receiving a bifurcated ferrite core or the like and releasably securing same to an electrical power line, said bifurcated ferrite core having two substantially U-shaped portions abuttable to form a closed loop, said holder comprising: a boat having an interior configuration that is complementary to one U-shaped portion of said bifurcated ferrite core to receive and hold said one portion, said boat being substantially L-shaped; a gantry parallel to one leg of said boat and coupled to the other leg for receiving both said one and the other U-shaped portions, said gantry having an interior configuration that is complementary to one leg of each U-shaped portion and being of a dimension sufficiently long to permit said U-shaped portions both to be received thereby yet be spaced apart from each other, said gantry having a guide groove provided on the exterior thereof; and a substantially L-shaped bale formed of resilient material, one leg of said bale extending over the base of said other U-shaped portion of said ferrite core and the other leg of said bale having at least a portion that is received by and rides in said groove on said gantry, said other leg having an end that terminates in a handle portion to be gripped and driven so as to move said other U-shaped portion guided in said gantry to abut against said one U-shaped portion and thereby encompass said power line, said handle portion being driven in the opposite direction to separate said U-shaped portions and thereby release said ferrite core from said power line, said handle portion having a locking ear and said gantry having a locking slot cooperable with said locking ear to releasably receive said locking ear, whereby said bale clamps said U-shaped portions together.

2. The holder of claim 1 wherein the end of said one leg of said bale includes a bent portion substantially parallel to said other leg to engage a corresponding leg of said other U-shaped portion of said ferrite core.

3. The holder of claim 1 wherein said one leg of said bale includes a bend at an intermediate portion thereof so as to exert a spring force on said U-shaped portions when said locking ear is received by said locking slot.

4. The holder of claim 3 wherein said bend tilts said other U-shaped portion of said ferrite core in a direction such that when it is driven toward said one U-shaped portion the legs thereof that are remote from said gantry abut before the remaining legs abut each other, at which time said locking ear is not received by said locking slot until said handle is driven further.

5. The holder of claim 1 wherein one end of said gantry is received by said boat such that said gantry and said boat appear substantially L-shaped, and said boat has a guide groove provided on the exterior thereof that is aligned with the guide groove on said gantry for receiving and guiding said end of said other leg of said bale when said bale is driven to move the U-shaped portions of said ferrite core together.

6. The hold of claim 1 wherein said handle portion of said bale extends adjacent said other leg such that said locking ear is substantially opposite and parallel to said one leg of said bale.

7. The holder of claim 6 wherein the intermediate portion of said other leg includes a step, and the locking slot of said gantry is opposite said guide groove, such that the portion of said other leg of said bale extending between said one leg and said step slides along the interior of said gantry while the portion of said other leg extending between said step and said handle portion slides in said guide groove.

8. The holder of claim 7 wherein the extent of said handle portion of said bale that extends to said locking ear and a coextensive extent of said other leg sandwich a portion of said gantry therebetween.

9. The holder of claim 8 wherein said locking ear is disposed above said one leg of said bale.

10. The holder of claim 1 wherein the cross-sectional area of one leg of said boat and the cross-sectional area of said gantry each is U-shaped.

11. The holder of claim 10 wherein the free end of said one leg of said boat is flared to guide a respective leg of said other U-shaped portion of said ferrite core into abutting relation with a corresponding leg of said one U-shaped portion of said ferrite core.

* * * * *